March 18, 1947.  J. M. PATTERSON  2,417,517
HANDLE COUPLING SOCKET
Filed Aug. 2, 1944
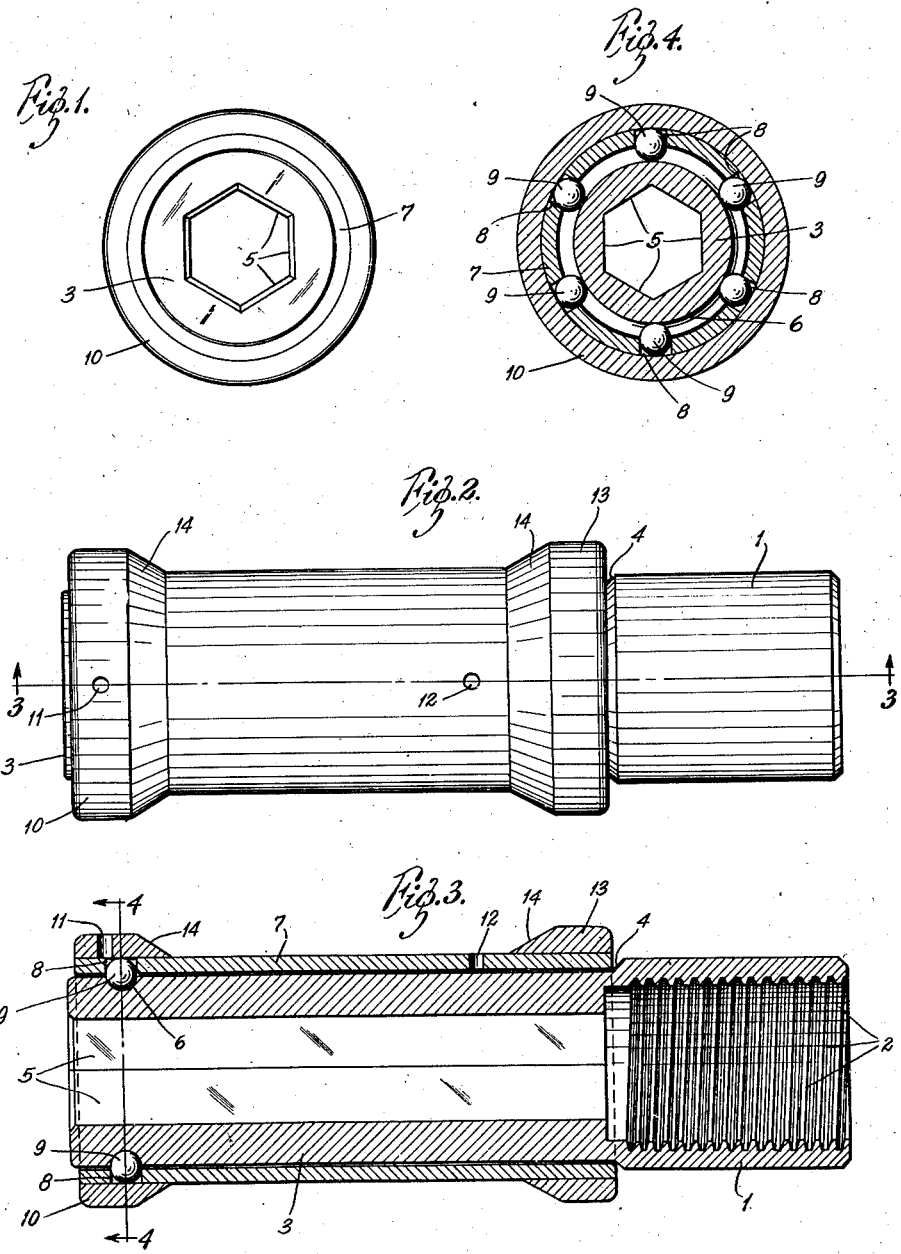
INVENTOR:
JAMES M. PATTERSON,
BY John D. Rippey
HIS ATTORNEY.

Patented Mar. 18, 1947

2,417,517

UNITED STATES PATENT OFFICE 2,417,517

HANDLE COUPLING SOCKET

James M. Patterson, Jennings, Mo., assignor to Central Mine Equipment Co., St. Louis, Mo., a corporation of Missouri Application August 2, 1944, Serial No. 547,683

2 Claims. (Cl. 279—9)

This invention relates to handle coupling sockets; and it has special reference to a handle coupling socket for engaging a coupling element on the end of an auger section to a thread bar or other member in order to attach or couple them together.

An object of the invention is to provide a coupling member for attaching a rotary auger or drill section to an operating bar or the like for rotation thereby, in combination with a handle sleeve rotatively mounted on said coupling member, anti-friction devices preventing longitudinal displacement of and leaving said sleeve freely rotative about said coupling member, and shoulders for preventing the hand of the operator from slipping along or from the sleeve and for reinforcing and strengthening the ends thereof.

Another object of the invention is to provide a cylindrical coupling member having a socket in one end provided with walls meeting at angles of more than 90°, for receiving a complementarily shaped coupling element on the end of an auger or drill section, and having an open opposite end for engaging a thread bar or other member to be connected or coupled with said auger or drill section, in combination with a cylindrical sleeve rotatively mounted on said coupling member, and anti-friction bearing elements preventing longitudinal displacement of said sleeve while leaving said sleeve freely rotative on and about said coupling member.

Various other objects and advantages should be apparent from the following description, reference being made to the annexed drawing, in which—

Fig. 1 is an elevation showing the hexagonal opening in one end of my improved handle coupling socket.

Fig. 2 is a side elevation of the handle coupling socket.

Fig. 3 is a longitudinal diametrical sectional view approximately on the line 3—3 of Fig. 2.

Fig. 4 is a cross-sectional view along the line 4—4 of Fig. 3, showing the anti-friction holding and ball bearing elements.

The unitary cylindrical coupling member has two opposite end portions for attachment, respectively, to the operating bar or device and to the auger or drill to be operated. As shown, the cylindrical coupling member has a tubular end portion 1 formed with internal threads 2 adapted to be engaged with the rotary thread bar of a familiar operating mechanism (not shown). That is, my improved handle coupling socket is adapted and designed specially for attaching or coupling a rotary mining auger or drill to the mechanism by which said auger or drill is rotated. A type of such rotary auger or drill is disclosed in Rassieur Patent No. 2,088,759, August 3, 1937, and in Cook Patent No. 2,010,510, August 6, 1935. The opposite end portion 3 of said coupling member has an outside diameter less than the outside diameter of the end portion 1, but this arrangement may be varied or omitted as desired. A circumferential shoulder 4 is formed at the end of the portion 1 that is integrally united with the portion 3. The end portion 3 has a socket therein provided with walls 5 meeting at angles of more than 90° for receiving a complementarily shaped coupling element on the end of a rotary auger or drill section such as disclosed in said Rassieur patent. Thus, the operating bar or mechanism may be operatively attached or coupled to the auger in order to operate or rotate the latter. The outer periphery of the end portion 3 of the coupling member is cylindrical.

A circumferential groove 6 is formed in and around one end of the portion 3. Said groove is continuous, is of uniform depth throughout, is arcuate in cross-section as shown in Fig. 3, and is approximately semi-annular in cross-section. A sleeve 7 is mounted on and encloses the end portion 3 of the coupling member, and has an inside diameter just slightly greater than the outside diameter of said portion 3. An annular series of holes 8 are formed in the sleeve 7 in communication with and have diameters equal to the cross-sectional width of the groove 6. A number of balls 9 are rotatively mounted in the holes 8 and in the groove 6. The diameter of said balls is very slightly less than the diameter of the holes 8 and of the cross-sectional width of the groove 6 so that, when said balls are engaged and retained in said holes and in said groove, they lock or prevent the sleeve 7 from becoming longitudinally displaced, and, at the same time, leave said sleeve freely rotative with the opposite end thereof adjacent to the circumferential shoulder 4. The holes 8 hold the balls 9 spaced equal circumferential distances about the member 3.

A ring 10 is mounted on and around the end of the sleeve 7 and around the series of balls 9 therein. Said ring is rigidly attached to the sleeve by welding or otherwise. The ring 10 does not clamp against or interfere with the free rotation of the balls 9, but does positively prevent said balls from becoming displaced. A hole 11 is formed through the ring 10 in communication with one of the holes 8, and thereby in communication with the groove 6. The hole 10 constitutes a passage for the injection of lubricant into the groove 6 to lubricate the balls 9 and prevent them from becoming adhered or stuck to the parts in which they are mounted. The hole 11 also constitutes an outlet passage for the discharge of foreign substances from the groove 6 and from the inside of the sleeve 7. Another hole 12 is formed through the sleeve 7 for the passage of lubricant to the inside of said sleeve, and for the passage of foreign substances therefrom. A complementary ring 13 is attached to the opposite end of the sleeve 7. The rings 10 and 13 are spaced apart a sufficient distance to receive between them the hand of the operator holding the sleeve 7 during operation. Beveled walls 14 are formed on the rings 10 and 13 to prevent injuring the hand grasping and holding the sleeve 7.

From the foregoing, it is evident that this invention attains all of its intended objects and purposes most efficiently and satisfactorily. The construction and arrangement of the parts forming the device may be varied within the scope of equivalent limits without departure from the nature and principle of the invention as defined by the appended claims.

I claim:

1. A handle coupling socket for coupling a driven device to an operating mechanism, comprising a coupling member having its ends engageable with said driven device and said operating mechanism, respectively, and having a circumferential groove, a sleeve rotatively mounted on said coupling member and having holes opening into said groove, anti-friction elements located in said holes and said groove preventing longitudinal displacement of and leaving said sleeve freely rotative about said coupling member, and a ring secured to said sleeve across the holes to prevent displacement of said anti-friction elements and forming an abutment for the hand at one end of said sleeve.

2. A device of the kind described comprising a handle sleeve member having a cylindrical interior surface, a coupling member within said sleeve member and having a cylindrical exterior surface of diameter to fit and freely rotate within said sleeve member, said coupling member having torque transmitting formations at each end of said sleeve, an annular raceway in the cylindrical surface of one of said members, a socket in the cylindrical surface of the other of said members in radial alignment with said raceway, said socket extending entirely through the wall of said member, a ball bearing in said socket extending radially across the space between said members and into said raceway whereby to prevent relative axial movement of said members, and means for preventing said bearing from moving radially out of said raceway and said socket.

JAMES M. PATTERSON.

REFERENCES CITED

The following references are of record in the file of this patent:

UNITED STATES PATENTS

| Number | Name | Date |
|---|---|---|
| 2,076,767 | French | Apr. 13, 1937 |
| 842,776 | Forbes | Jan. 29, 1907 |
| 1,901,973 | Macey | Mar. 21, 1933 |
| 1,388,925 | Bullard | Aug. 30, 1921 |
| 1,120,530 | Pieper | Dec. 8, 1914 |